April 21, 1953

A. J. HORNFECK 2,636,151

MEASURING SYSTEM

Filed Jan. 31, 1952

INVENTOR.
ANTHONY J. HORNFECK

BY Raymond W. Jenkins
ATTORNEY

April 21, 1953 A. J. HORNFECK 2,636,151
MEASURING SYSTEM

Filed Jan. 31, 1952 4 Sheets-Sheet 2

INVENTOR.
ANTHONY J. HORNFECK
BY
Raymond W. Junkins
ATTORNEY

Patented Apr. 21, 1953

2,636,151

UNITED STATES PATENT OFFICE 2,636,151

MEASURING SYSTEM

Anthony J. Hornfeck, South Euclid, Ohio, assignor to Bailey Meter Company, a corporation of Delaware Application January 31, 1952, Serial No. 269,274

9 Claims. (Cl. 318—29)

This invention relates to electric calculating systems, and more particularly to systems which are adapted to indicate or record a product of variables such as quantities, qualities, conditions, or the like.

This invention further relates to novel forms of movable core transformers having a plurality of purposes, and more particularly, to movable core transformers which simultaneously establish an output potential which varies in phase and magnitude in accordance with a variable and an output potential which remains substantially constant over the range of variable values. The constant potential may be utilized to energize devices adapted to produce a potential with which to balance the variable output or devices responsive to a second variable. Another general combination of these dual-purpose movable core transformers is found in the control of their variable outputs to balance the variable output of a responsive device while their constant output supplies the basic energization of the responsive device. The flexibility of these movable core transformers enables balanceable networks to attain a high degree of efficiency in performance and economy in the number and size of transformer-type of devices required.

A preferred form of my invention may include a balanceable network which is sensitive to variables and which operates when unbalanced to effect an actuation of a device for rebalancing the network. The unbalancing of the network may be produced by moving one or more adjustable members which are so interrelated as to effect an unbalance proportional to the product of values represented by positions of the members. If desired, each of the members may be positioned in response to some variable or only one of the members may be positioned in response to a variable while another member is positioned manually to establish a factor by which the variable is to be multiplied.

Another form of my invention may include a balanceable network in which an unbalance may be produced by the inherent sensitivity of one of the included devices to the variable. One of these included devices may take the form of a Wheatstone bridge having a temperature sensitive leg and having its energizing potential supplied from the constant potential of the dual-purpose movable core transformer. In any event, the balanceable networks, in which my dual-purpose movable core transformer is useful, are not restricted to networks including devices mechanically actuated in accordance with variables.

An object of my invention is to provide an improved calculating system. Another object is to provide an improved electrical system for indicating the product of a plurality of values. Still another object is to provide an improved calculating system having a balanceable network and means for producing an unbalance of the system in proportion to the product of variables.

Other objects of my invention are found in the provision of a movable core transformer with a plurality of outputs. Still another object is to provide a combination of potential producing devices with the dual-purpose transformer for performing calculations or single element measuring functions with an efficiency and economy not heretofore attainable with conventional combinations.

In the accompanying drawings there are shown for purposes of illustration several forms which my invention may assume in practice. In these drawings.

Figure 1:
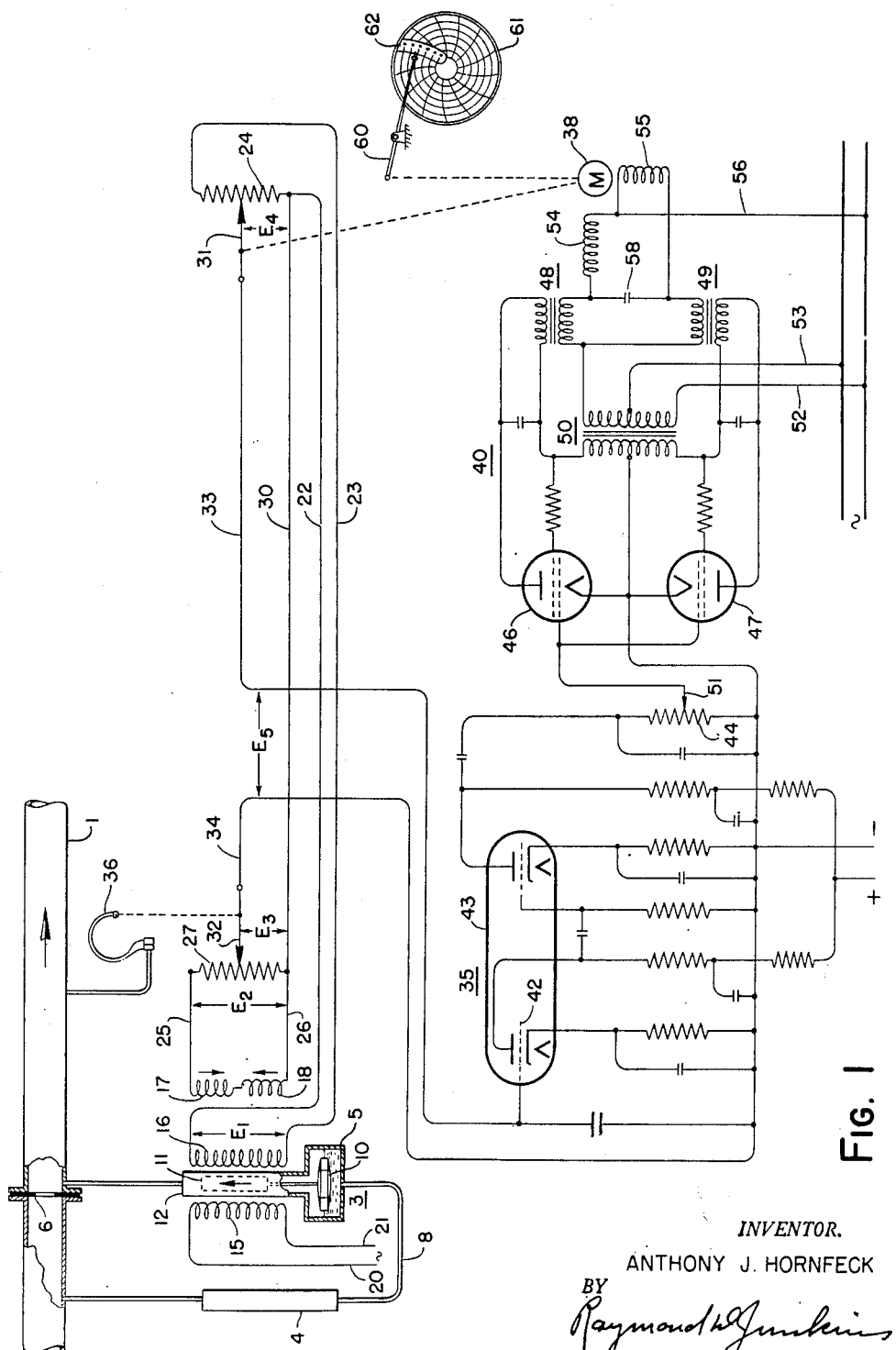
Fig. 1 is a schematic diagram of a system for indicating the product of the rate of flow and pressure in a fluid conducting conduit.

Referring to the drawings it will be noted that there is shown in Fig. 1 a system for indicating the product of the rate of fluid flow and pressure in a conduit 1. The rate of flow is determined by a flow meter, generally designated 3, comprising a U-tube having legs 4 and 5 connected at one end in communication with the conduit at opposite sides of an orifice plate 6, and joined at their opposite ends by a tube 8. A liquid, such as mercury, partially fills the legs of the U-tube and is subjected to the pressures in the conduit at opposite sides of the plate 6. On the surface of the liquid in leg 3 is a float 10, which is adapted to position a magnetic member 11 within a leg portion 12 made of non-magnetic material. The member 11 acts as the core of a transformer which has a primary winding 15, a secondary winding 16, and a pair of secondary windings 17, 18 connected in series bucking. The primary winding is connected by conductors 20 and 21 to a source of alternating current and is magnetically coupled by the member 11 to the secondary windings. The ends of the secondary winding 16 are connected by conductors 22 and 23 to the ends of a potentiometer 24, and the remote ends of the windings 17, 18 are connected by conductors 25, 26 to the ends of a potentiometer 27.

The core member 11 is so arranged as to effect a constant induced potential $E_1$ in the secondary winding 16 for any position that it may assume during variations in the flow of fluid through conduit 1. At a predetermined rate of fluid flow, the member 11 assumes a central position relative to the secondary windings 17, 18, and the resultant induced potential in these windings is then equal to zero. A movement of the core member from its central position results in an increase in the potential induced in one of the windings 17, 18, and a decrease in the potential induced in the other winding. The resultant potential across these windings will then be equal to some value $E_2$ which is dependent upon the distance at which the core member is spaced from its neutral position.

The potentiometers 24, 27 are connected together at one end by a conductor 30 and are provided with movable contacts 31 and 32 respectively connected by conductors 33 and 34 to an amplifier 35. The circuit including the secondary windings 16, 17, 18, the potentiometers 24, 27, and the conductors 30, 33, 34 comprises a balanceable network of the null type. The movable contact 32 is shown herein connected to a Bourdon tube 36 which is responsive to pressures in the conduit 1, and the contact 31 is operatively connected to a motor 38 for adjustment by the latter. A motor control circuit 40 is adapted to be energized by the amplifier when the network becomes unbalanced and effects an operation of the motor in a direction to rebalance the network.

The connections between the amplifier and the potentiometers 24, 27 are such that the potentials across the portions of the potentiometers between the conductor 30 and the movable contacts oppose each other in determining the potential applied to the amplifier. The potential across the portion of the potentiometer 27, represented by $E_3$, will be seen to vary directly with the potential $E_2$ as well as with the movement of the contact 32. Since the potentiometer 24 is subjected to a constant potential $E_1$, the potential $E_4$ between the conductor 30 and the contact 31 will vary only with the movement of the contact and will be equal to the potential $E_3$ when the network is balanced.

A change in the rate of fluid flow or a change in pressure in conduit 1 causes the potential $E_3$ to vary and establish a potential $E_5$ which is subjected on the grid 42 of a double triode tube 43 in the amplifier circuit. A resistance 44 connected in the output circuit of the amplifier has a potential across it varying with the potential on the grid 42.

The motor control circuit 40 includes tubes 46 and 47 having their anodes connected respectively through windings of saturable core reactors 48 and 49 to opposite ends of the secondary winding of a power transformer 50. The cathodes of the tubes are connected to the mid point of the secondary winding and to one end of the resistance 44, and the tube grids are connected to a movable contact 51 for the resistance 44. The primary winding of the power transformer is connected to an A. C. power line by conductors 52 and 53. It will be seen that with one phase output of the amplifier 35, the tube 46 will be made conductive at such a time that current may flow from the secondary of the power transformer during one-half cycle through the winding of the saturable core reactor 48 and the tube back to the transformer. During the other half of the cycle, the tube 47 will become non-conductive and no current will flow in the motor control circuit. When the phase output of the amplifier reverses, the tube 47 becomes conductive at the proper time to permit current to flow during one-half cycle from the power transformer through the saturable core reactor 49, and the tube 46 becomes non-conductive during the other half cycle to prevent current flow at such time.

The circuit for the motor 38 includes stator windings 54 and 55 connected at adjacent ends through a conductor 56 to one side of the power line and connected at their opposite ends to windings of the saturable core reactors 48 and 49. Connected between the remote ends of the motor windings 54 and 55 is a condenser 58. The ends of the saturable core reactor windings remote from the motor windings are connected through the primary of the transformer 50 and the conductor 53 to the side of the power line opposite from the conductor 56.

When the portion of the motor control circuit including the reactor 48 and the tube 46 is conducting current, the reactance of the output winding of the reactor 48 is reduced to a low value so that current passes readily from the power line through the conductor 53, the output winding of the reactor 48, the motor winding 54 and the conductor 56 to the other side of the power line. Current also passes from the output winding of the reactor 48 through the condenser 58 and the motor winding 55 to the other side of the power line. The condenser will cause the phase of the current in winding 55 to lead that of the current in the winding 54, and the motor will rotate in one direction. A reversal in phase of the amplifier output will cause the portion of the motor control circuit, including the reactor 49 and the tube 47, to permit current flow from the power transformer. The reactance of the output winding of the reactor 49 will then be reduced so that current will flow from the power line directly through the motor winding 55, and through the condenser 58 to the winding 54. The phase of the current in winding 54 will then lead that of winding 55, and the motor will rotate in the opposite direction.

The connection between the motor 38 and the contact 31 is such that rotation of the motor will position the contact so as to bring the potential $E_4$ to a value more nearly equal to the potential $E_3$. When the potentials $E_3$ and $E_4$ become equal, the grid 42 of the amplifier is no longer subjected to a potential, and the output of the amplifier becomes zero so that the motor 38 is no longer energized. If the core member 11 and the contact 32 are moved together or separately to produce a potential $E_3$ exceeding the potential $E_4$, then the phase of the potential subjected on the grid of the amplifier will be such as to effect an operation of the motor in a direction to increase the potential $E_4$. Movement of the core member 11 or the contact 32 to positions which produce a potential $E_3$ less than the potential $E_4$ results in a potential of reverse phase on the amplifier and an energization of the motor to position the contact 31 so as to reduce the potential E₄. The positioning of the contact 31 by the motor in either case will be indicative of the product of the values or conditions which caused the core member 11 and the contact 32 to assume the positions determining the position of the contact 31.

In order that a visual indication or a record of the product of such values may be had, an indicator or pen arm 60 is operatively connected to the motor 38 and is arranged to cooperate with a chart 61 and an indicating scale 62.

It will be appreciated that the core member 11 and the contact 32 may be positioned by any means other than that shown responsive to the variable conditions to be measured, and the potential across the balancing potentiometer 24 could as well be produced by other means and from a source different from that producing the potential changes to be measured.

Figure 2:
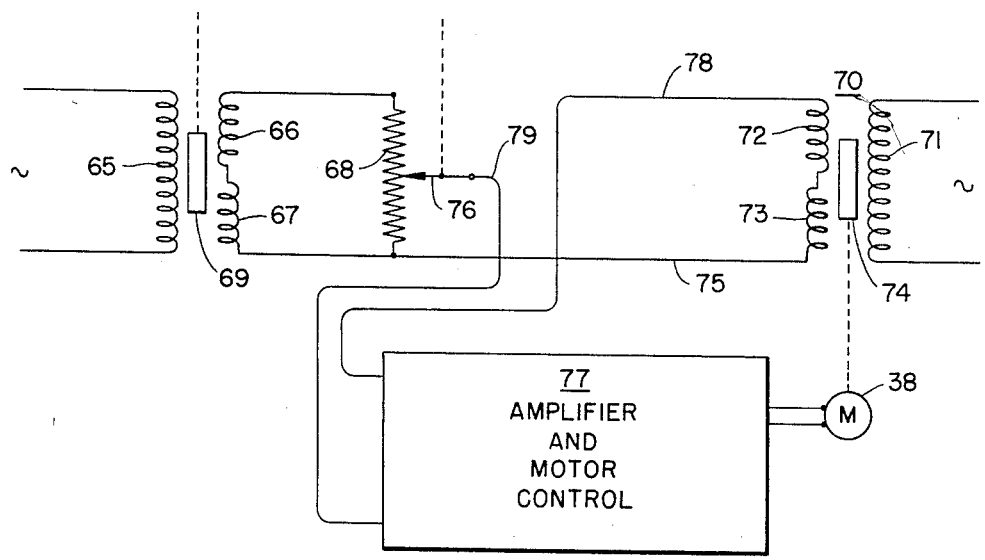
Figs. 2 and 3 are schematic diagrams of other systems for indicating products of variables.

In Fig. 2 I have shown a transformer having a primary winding 65 connected to a suitable source of A.-C., and bucking secondary windings 66 and 67 connected across a potentiometer 68. A core member 69 magnetically couples the transformer windings and is adapted to be positioned by any variable condition. A balancing transformer 70 has a primary winding 71 connected to a source of A.-C., and a pair of bucking secondary winding 72 and 73 magnetically coupled to the primary winding by a core member 74 which is operatively connected to the motor 38. A conductor 75 connects one end of the potentiometer 68 to one end of the bucking secondary windings, and the other end of the secondary windings and a contact 76 movable along the potentiometer 68 by any variable, are connected to an amplifier and motor control 77, similar to that of Fig. 1, by conductors 78 and 79, respectively.

The potential across the portion of the potentiometer 68 between the contact 76 and the conductor 75 opposes the potential across the bucking secondary windings 72 and 73. When the potentials are unequal, the motor 38 operates to position the core member 74 until the potential across the secondary windings equals that across the portion of the potentiometer 68. The position of the core member 74 when the system is balanced, or the position of any suitable indicating means as shown in Fig. 1, indicates the product of the variables positioning the core member 69 and the contact 76. If desired, the core member 69 or the contact 76 may be positioned manually to establish a factor by which the variable positioning the other element is to be multiplied.

Figure 3:
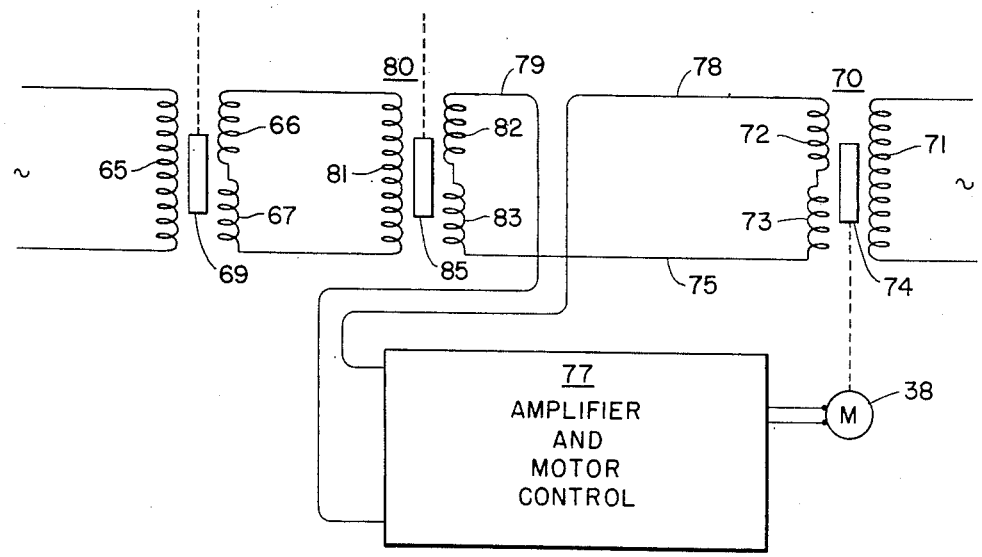

Fig. 3 shows a system like that of Fig. 2 except that a transformer 80 is provided in place of the potentiometer 68. This transformer has a primary winding 81 connected to the ends of the secondary winding 66, 67, and bucking secondary windings 82 and 83 connected at opposite ends to the conductor 75 and 79 leading, respectively, to one end of the bucking secondary windings 72, 73 and to the amplifier 77. A core member 85 magnetically couples the windings 81, 82, 83, and is adapted to be moved relative to the windings by some variable. The operation of this system is similar to that of Figs. 1 and 2.

Figure 4:
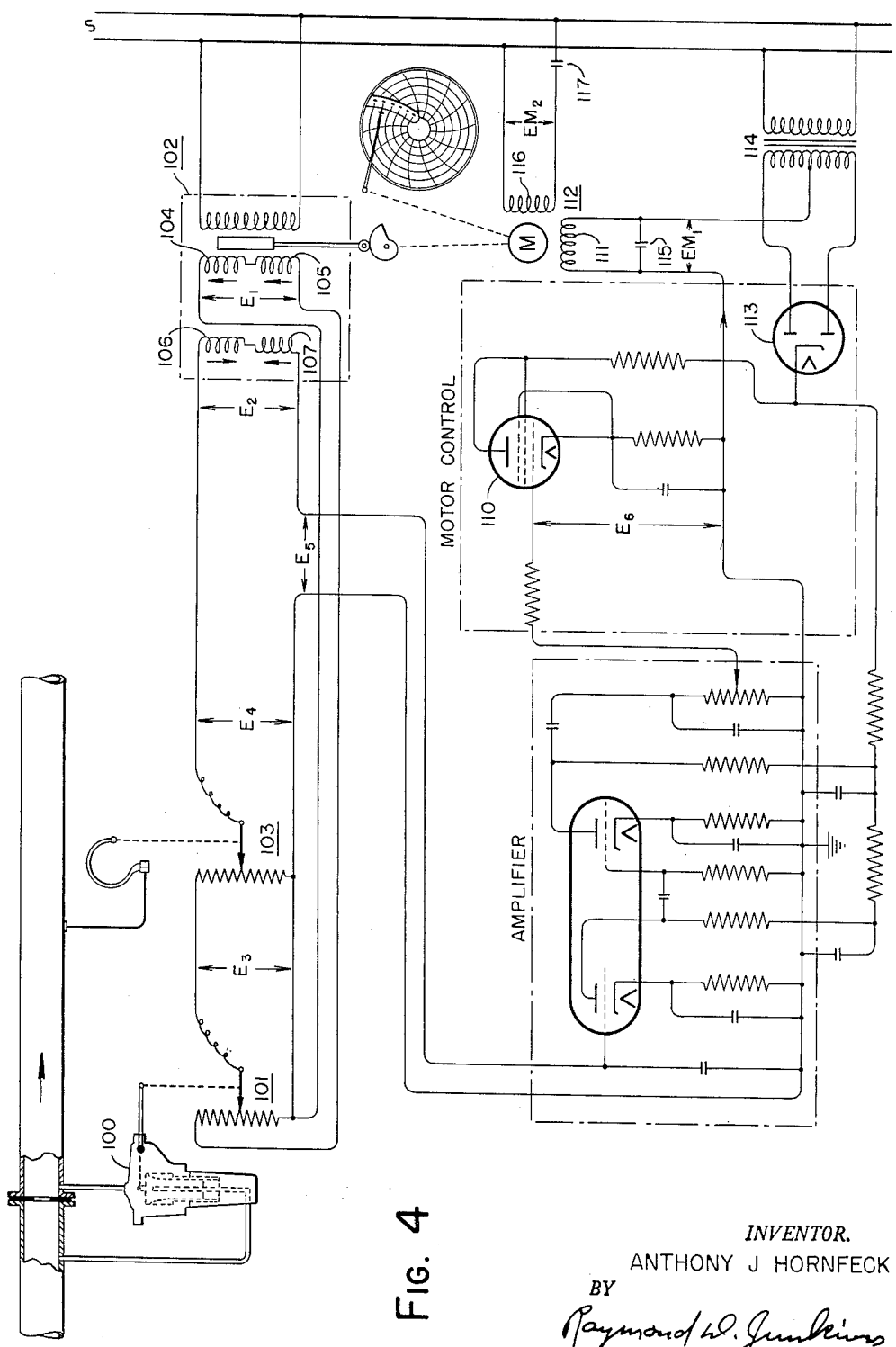
Fig. 4 is a schematic diagram of a system for indicating the product of the rate of flow and pressure in a fluid conducting conduit when balanced by my novel form of movable core transformer.

Referring now to Fig. 4 it will be noted that the novel form of movable core transformer disclosed as an integral part of flow meter 3 in Fig. 1, is now disclosed as a means for balancing a network having a similar function to that of the Fig. 1 network.

The flow meter 3 is supplanted, in Fig. 4, by a conventional type of differential, mechanical motion meter which gives a linear response with respect to flow. As diagrammatically depicted, meter 100 moves the contact of potentiometer 101 whose resistance is energized by the constant potential output of the dual-purpose movable core transformer 102. The output of potentiometer 101 energizes potentiometer 103 whose contact is actuated from pressure as in Fig. 1 and the output of 103 is balanced by the varied output of 102 to indicate the product of the values, or conditions, of flow and pressure.

The result attained by the system of Fig. 4 is similar to that attained by Fig. 1 but the altered combination with the novel movable core transformer emphasizes the flexibility of this device in a balanceable network. The position of the transformer in the system of Fig. 1 is, in one sense, reversed by the Fig. 4 disclosure.

Proceeding to a more detailed explanation of the function of the system of Fig. 4 it is to be noted that transformer 102 includes, actually, two secondary windings in each of the two sets. This more fully explains the generation of $E_1$ to be produced by the windings 104 and 105 connected in aiding relation to each other, as their adjacent arrows indicate. Secondary windings 106 and 107, are connected bucking as are windings 17 and 18 of Fig. 1 and when the core assumes a central position relative to the windings the resultant induced potential in these windings is equal to zero. A movement of the core from its central position results in an increase in the potential induced in one of the windings 106, 107 and a decrease in the potential induced in the other winding. The resultant potential across these windings will then be equal to the value $E_2$ which is dependent upon the distance at which the core is spaced from its neutral position.

With the constant potential $E_1$ impressed across the resistance of 101, the portion of the potential $E_1$ selected by meter 100 in its positioning of the contactor of 101 ($E_3$) is impressed across the resistance of 103. The contactor of 103 is then positioned by the pressure responsive device to select a portion of the output potential of 101 as $E_4$ for comparison with the variable output potential $E_2$ of the windings 106, 107 of transformer 102.

As in Fig. 1, the potential outputs of 103 and 102 are brought together in an amplifier section similar to 35. This amplifier is a well known electronic type including a double triode electron tube, preferably of the 6SL7 type. A departure of the potential outputs of 102 and 103 from equality establishes a potential $E_5$ on the amplifier of one phase or the other, depending upon which of the outputs is the greater, and of a magnitude dependent upon the amount by which they differ.

The motor control circuit disclosed in Fig. 4 is structurally quite different from that of Fig. 1 although directed to the same function of sensing the phase of the output of the amplifier and consequently the unbalance of the measuring circuit for subsequently operating the motor which will position the core of movable core transformer 102 to rebalance the measuring circuit. The control circuit consists of a single tube 110, preferably of the high $G_m$ or mutual conductance type, such as the 6AG7. This tube is connected in series with the control winding 111 of the motor 112. The plate current for the tube 110 is unfiltered pulsating D.-C. current obtained from a full wave rectifier tube 113 of the 6X5 type, receiving its power from a transformer 114 connected to the alternating current power source for the entire system. The potential output of the amplifier, produced by an unbalance of the measuring circuit, is applied to the grid of the motor control tube 110. This potential, applied to the control grid, will cause an increase in the no-load plate current during the half-cycle when it is in phase with the plate current and a decrease during the half-cycle it is out of phase. As a result, with the large grid signal, half wave pulses of D.-C. current will flow into the motor circuit comprised of the control winding 111 and the capacitor 115 in parallel. The phase of this pulsating current depends on the phase of the grid signal which is $E_5$ amplified.

The motor 112 is, in effect, a two-phase motor which may be described as being a capacitor-run induction motor having a two-phase stator winding and a high resistance squirrel cage type rotor. There are two identical but separate windings 111, 116, the capacitor 117 being connected in series with a capacitor 116 across the A.-C. power line so that voltage drop $EM_2$, leads the line potential by nearly 90°. The capacitor 117 is chosen so that it is in resonance with the inductance of the winding 116 at the operating frequency and forms a series resonance circuit. This results in a voltage drop across the winding 116 which is approximately double the line potential for the particular motor used.

The second winding 111, which I will term the control winding, while identical with the first winding 116 in construction, differs in that it has a capacitor 115 connected in parallel across it. The capacitor 115 is designed to produce a condition of parallel resonance at 60 cycles. The plate of the motor control tube 110 is always positive. At balance, some current flows during each half cycle, but since this current is only slightly pulsating direct current and has no fundamental component of supply line frequency, no output torque on the motor is produced. Any tendency of the motor to coast is restrained by the dampening action of the D.-C. component which applies a braking action. As balance is approached from an unbalanced condition, there results a reduction in the fundamental component of supply line frequency in the output circuit of tube 110, and a consequent and simultaneous increase in the D.-C. component which produces a dynamic braking action and prevents over-travel.

When the measuring circuit is unbalanced, half-wave pulsating current which flows from the motor control tube 110 into the winding 111 and capacitor 115 has a large fundamental 60 cycle component retaining, as well, higher frequency harmonic components and the D.-C. component which gives the braking action upon motor rotation. However, this parallel circuit is tuned so that the capacitor 115 is in resonance with the winding 111 inductance for 60 cycles. This produces a large A.-C. voltage drop $EM_1$ of 60 cycle frequency across the motor winding 111, but reduces the harmonics to a minimum since the parallel resonance circuit acts like a very high impedance to 60 cycle current, but a relatively low impedance to harmonics. In this arrangement the motor tube current may be only 12 milliamps with 30 milliamps or more alternating current in the control winding 111. This A.-C. control winding voltage drop lags or leads the main winding 116 potential by approximately 90°, depending on the phase of the control tube 110, grid potential and direction of unbalance of the measuring circuit. Consequently, the motor 112 will run as a two-phase motor in a direction determined by the phase relationship by the winding voltage drops and rebalance the circuit by actuation of the core of movable core transformer 102.

The motor is of a low inertia rotor type having high impedance windings. The speed of response of the motor to amplifier signal is far higher than the system of Fig. 1 because of the low motor inertia and the absence of time lag in the motor control circuit. Stability is obtained with total travel time of full scale indicator or recorder operation of approximately one second, and with the sensitivity of one-tenth percent or better. At this speed of travel and sensitivity, a sudden change in the input signal will produce a single cycle of overshoot or one percent maximum.

This motor control circuit is described in even more detail in my Patent 2,544,790.

It can thus be seen that the system described in Fig. 4 provides a balanceable network which may be unbalanced in one direction or another by variations in either or both of the two conditions, flow and pressure, of the fluid in the conduit disclosed. When the balance of the network is disturbed, its potential output $E_5$ is of a phase and magnitude representative of the direction and extent of network unbalance. Such output $E_5$, applied to the amplifier, produces an amplified A.-C. signal $E_6$ of phase and magnitude representative of network unbalance which is applied to the motor control, resulting in rotation of the motor 112 in one direction or the other dependent upon the direction of unbalance. Such motor rotation is in proper direction to position the core of movable core transformer 102 to rebalance the network and decrease the output $E_5$ to zero. As the system approaches balance, considerable braking action is effective on the rotor, which reduces the tendency to over-travel and hunting.

Simultaneously with the positioning of the movable core transformer 102 the motor 112 positions the indicator an amount representative of the product of the flow and pressure.

Figure 5:
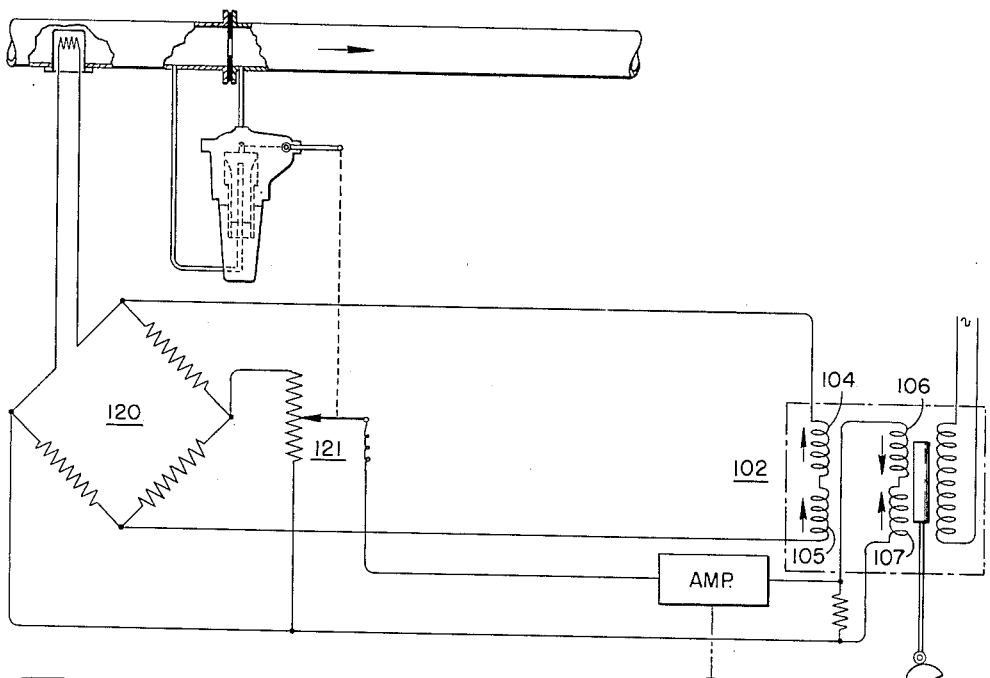
Fig. 5 is a schematic diagram of another system for indicating a product of temperature and flow in a fluid conducting conduit when balanced by my novel form of movable core transformer.

Coming now to Fig. 5 I disclose for the first time, in connection with a balanceable network of the types found in Figs. 1 and 4, a responsive device which varies a voltage output without resort to mechanical actuation. In short, a Wheatstone bridge is arranged sensitive to the temperature condition of the fluid flowing in the disclosed conduit. This bridge 120, although adjacent the point at which the measurement is taken, may be given its basic potential supply from the secondary windings 104, 105 of movable core transformer 102, which is located at a comparatively remote point of recordation and/or control action with respect to the fluid of the conduit. The output potential of bridge 120 is similar to that of potentiometer 101 of Fig. 4 in that it in turn energizes potentiometer 121, responsive to flow of the fluid.

The balancing of the Fig. 5 system proceeds as in Fig. 4 but without mechanical actuation within, or of, responsive device 120. This association of the novel movable core transformer 102 again illustrates the broad application permissible with the device in any system wherein the base-loading, or energizing, potential of the responsive elements is desirably emanated from a single location. Whether the responsive elements are located adjacent the point of recordation and/or control, or are separated therefrom by substantial distance, whether the potential delivering devices are mechanically actuated from the variable or inherently respond to the variable, or whether the base-loading potential structure is to be located at the transmitter or receiver, my novel transformer is useful in reducing the number of transformer devices required for energization and in providing these functions in any desired combination.

Figure 6:
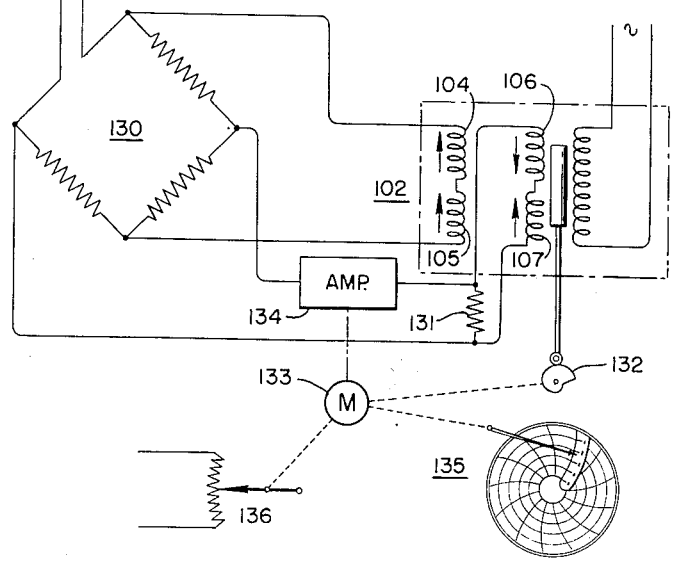
Fig. 6 is a schematic diagram of a system for indicating temperature of a condition by a bridge supplied and balanced by my transformer.

In Fig. 6 I have disclosed a relatively simple combination of a sensitive bridge balanced against my novel, dual-purpose movable core transformer output. More commonly, in the past, it has been the practice to either vary an opposing resistance leg of a Wheatstone bridge until a balance is attained or to allow the bridge to remain unbalanced, with its output across a load resistance. I now propose, with my dual-purpose movable core transformer, to allow the bridge to remain unbalanced with its output across a load resistance, but to oppose the output across this load resistance with the variable output of my novel transformer. I have specifically disclosed this in the structure of the bucking sets of secondaries simultaneously opposing the bridge 130 output across resistance 131. The core transformer 102 is positioned by cam 132 as a link with motor 133 which is driving it, until the secondary potential equals the bridge potential.

The difference, in phase and magnitude, between the potentials at any one time is sensed by the amplifier 134 in series with the bridge output and resistor 131, and the motor 133 responds to reduce this difference by actuating cam 132 to position the core of transformer 102.

Motor 133 can be easily arranged to not only actuate cam 132 but simultaneously actuate an indicating and/or recording device 135 as well as a potentiometer 136 incorporated in a telemetering circuit, not shown, transmitting the motion as a value of the variable temperature to a remote position of recordation and/or indication and possibly control of the variable.

Fig. 6, in contrast to the elongated system to Fig. 5, is conceived as a compact, unified, combination of the temperature measuring instrument. The novel movable core transformer is useful in either combination. In either embodiment, the conventional balancing potentiometer is superseded by my novel movable core transformer which is more suitable for operating in corrosive or explosive atmospheres because of the elimination of exposed contacts and slidewires.

While I have described several forms which my invention may assume in practice, it will be understood that the invention is not limited to these forms but may be modified and embodied in various other forms without departing from the spirit or the scope of the appended claims.

This application is a continuation-in-part of my application Serial No. 731,465, filed February 28, 1947, now abandoned.

What I claim as new, and desire to secure by Letters Patent of the United States, is:

1. A measuring network including, in combination; a transformer having a primary winding, a first secondary winding structure, and a second secondary winding structure including a pair of bucking secondary windings; a source of alternating current potential for the primary winding; a core member for varying the potential induced in the bucking secondary windings while producing no total effect on the potential induced in the first secondary winding structure; means for positioning the core in response to changes in a variable; a potentiometer connected across the first secondary winding structure and having a movable contact; means for connecting the potentials between the ends of the second secondary winding structure and one end of the potentiometer and its contact in opposition; and means responsive to any difference between said potentials for operating the contact to balance the potentials.

2. A calculating network comprising, in combination, a transformer having a primary winding, a single secondary winding, and a pair of bucking secondary windings, means for connecting said primary winding to a source of alternating current potential, a core member magnetically coupling said primary winding to said secondary windings and movable relative thereto so as to vary the potentials induced in the bucking secondary windings and to produce no effect on the potential induced in the single secondary winding, means for moving said core member in response to changes in the variable, a potentiometer connected across said bucking secondary windings and having a movable contact, means for moving said contact in response to changes in a second variable, a potentiometer connected across said single secondary winding and having a movable contact, means for connecting the potentials between one end of each of said potentiometers and their contacts in opposition to each other, and means responsive to any difference between said potentials and operative to position the contact for said second mentioned potentiometer in a direction to balance the potentials.

3. The calculating network of claim 2 in which the means responsive to differences between potentials is an electronic amplifier having a pair of output tubes selectively energized in accordance with the phase of said difference, a motor for operating the contact for said second potentiometer and means dependent upon the tube energized to control the direction of motor operation.

4. A measuring network including, in combination; a transformer having a primary winding, a first secondary winding structure, and a second secondary winding structure including a pair of bucking secondary windings; a source of alternating current for the primary winding; a core member for varying the potentials induced in the bucking secondary windings while not producing any variation in the total potential induced in the first secondary winding structure; a variable potential delivering means connected across the first secondary winding structure; means for connecting the potentials across the second secondary winding structure and the variable potential delivering means in opposition; and means responsive to any difference between said potentials adapted to vary one of the potentials to bring them to equality.

5. A measuring network including, in combination, a device delivering a potential in accordance with a variable, a movable core transformer with a pair of bucking secondaries and a pair of aiding secondaries providing a dual output, means for arranging the aiding secondaries to energize the device delivering the variable potential, means for arranging the output of the bucking secondaries to oppose the output of the device delivering the variable potential, means responsive to the difference between the output of the bucking secondaries and output of the device delivering the variable potential, actuating means for the movable core transformer controlled by the responsive means to vary the output from the bucking secondaries until the variable potential is balanced, and means for indicating the balance as a measure of the variable.

6. A measuring and calculating network including, in combination; a first device delivering a potential in accordance with a first variable of a condition; a second device energized by the potential delivered by the first device and producing a potential in accordance with a second variable and the energization; a movable core transformer with a pair of bucking secondaries and a pair of aiding secondaries providing a dual output, the aiding secondaries energizing the first device and the bucking secondaries opposing the output voltage of the second device; and means responsive to any difference between the opposed voltages and operative to position the core in a direction to balance the potentials.

7. The network of claim 6 in which the means responsive to differences between the opposed potentials is an electronic amplifier sensitive to the phase of the difference, a motor for operating the movable core transformer core and means dependent upon the amplifier output to control the direction of motor operation.

8. A measuring network including, in combination, a Wheatstone bridge sensitive to a temperature condition and delivering a potential output in accordance with the value of the temperature; a movable core transformer with a dual set of secondary windings, one of the set arranged to energize the bridge, and the other set arranged to oppose the bridge output; a device sensitive to difference between the opposed outputs of bridge and transformer; and means controlled by the sensitive device to actuate the transformer core toward reduction of the difference.

9. A balanceable network including; a transformer having a primary winding energized to form a source of alternating current potential, a first secondary winding structure, a second secondary winding structure comprising a pair of bucking secondary windings, and a core member for varying the potentials induced in the bucking secondary windings while producing substantially no variation in the total potential induced in the first secondary winding structure; means introducing the output of the second secondary windings into the network; a first device energized by the potential of the first secondary winding and introducing its output into the network; a second device energized from the second secondary windings of the transformer and introducing its output into the network; means for varying the output of one device into the network by a variable; and means responsive to the unbalance of potentials in the network and adapted to vary the output of the other device into the network to balance the network.

ANTHONY J. HORNFECK.

References Cited in the file of this patent

UNITED STATES PATENTS

| Number | Name | Date |
|---|---|---|
| 1,960,350 | Shackleton | May 29, 1934 |
| 2,208,623 | Bond | July 23, 1940 |
| 2,346,838 | Haight | Apr. 18, 1944 |
| 2,406,221 | Hornfeck | Aug. 20, 1946 |
| 2,439,891 | Hornfeck | Apr. 20, 1948 |

FOREIGN PATENTS

| Number | Country | Date |
|---|---|---|
| 553,947 | Great Britain | June 11, 1943 |
| 722,351 | France | May 16, 1932 |